United States Patent [19]

Nortenius et al.

[11] Patent Number: 5,067,248
[45] Date of Patent: Nov. 26, 1991

[54] LINEAR MEASURING APPARATUS

[75] Inventors: Bengt A. Nortenius, Hudiksvall;
Per-Erik B. Olsson, Näsviken;
Nils-Erik G. Grip, Hudiksvall, all of Sweden

[73] Assignee: Telefonaktiebolaget L M Ericsson, Stockholm, Sweden

[21] Appl. No.: 691,799

[22] Filed: Apr. 26, 1991

[30] Foreign Application Priority Data

May 17, 1990 [SE] Sweden .................. 9001790

[51] Int. Cl.⁵ .................. G01B 5/04; G01B 3/12
[52] U.S. Cl. .................. 33/744; 33/735; 33/737; 33/751
[58] Field of Search .................. 33/737, 744, 751, 776, 33/778, 735

[56] References Cited

U.S. PATENT DOCUMENTS 4,041,610  8/1977  Uesugi et al. .

FOREIGN PATENT DOCUMENTS

| 0338932 | 4/1989 | European Pat. Off. . |
| 2446128 | 4/1976 | Fed. Rep. of Germany . |
| 2654996 | 6/1978 | Fed. Rep. of Germany . |
| 2757363 | 6/1982 | Fed. Rep. of Germany . |
| 58-55801 | 2/1983 | Japan . |
| 59-94007 | 5/1984 | Japan . |
| 756153 | 4/1953 | United Kingdom . |
| 824482 | 1/1955 | United Kingdom . |
| 2154000 | 2/1984 | United Kingdom . |

*Primary Examiner*—Harry N. Haroian
*Attorney, Agent, or Firm*—Burns, Doane, Swecker & Mathis

[57] ABSTRACT

A linear measuring apparatus for measuring elongated materials such as cables is disclosed. The apparatus includes a measuring station which includes two endless belts which run over two pulleys and between which the material to be measured is drawn. The measuring station is provided with sensors to which a counter unit is connected for indication of material lengths, and the endless belts (5a, 5b) extend horizontally, side-by-side, and resiliently abut the material to be measured.

7 Claims, 2 Drawing Sheets

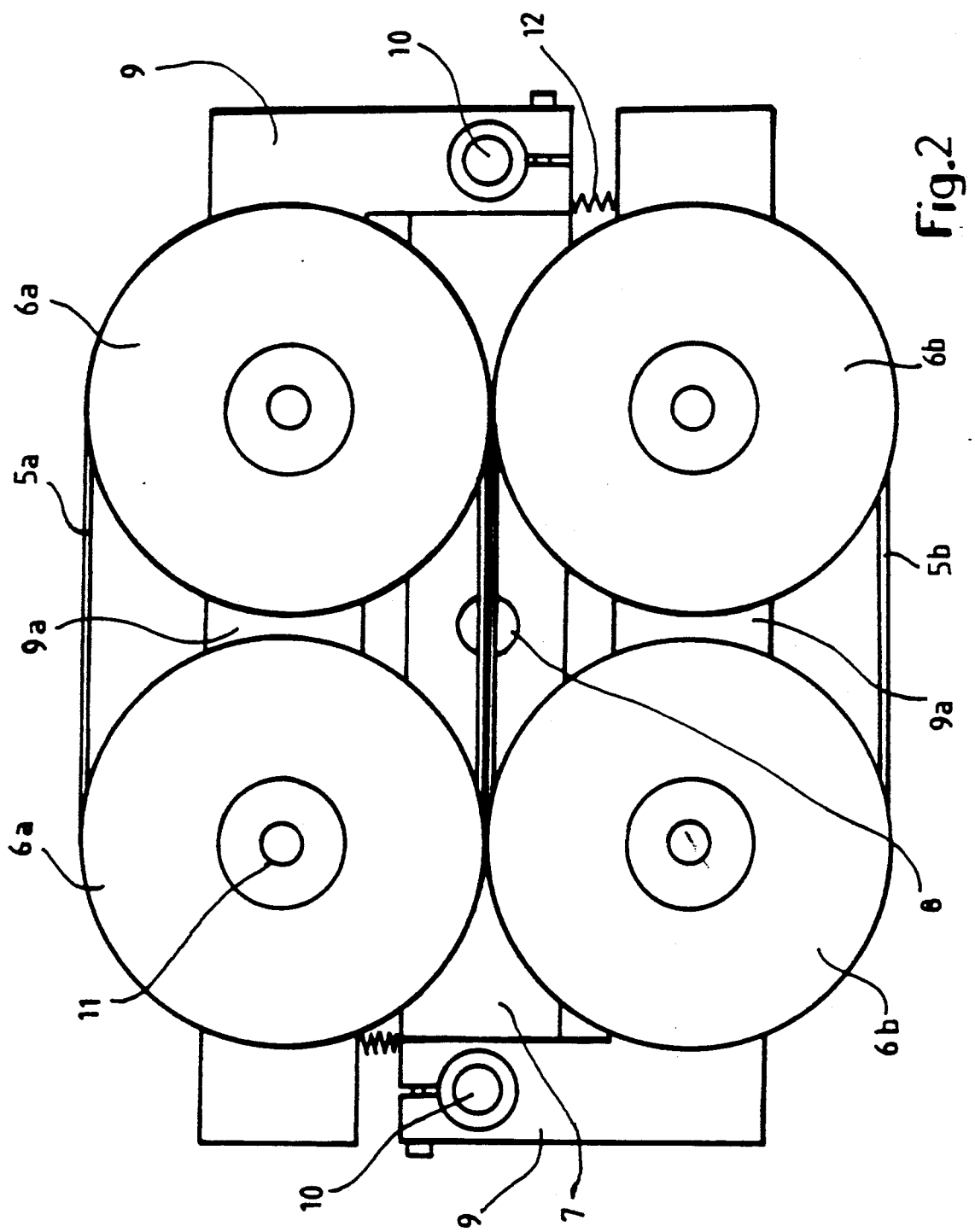

LINEAR MEASURING APPARATUS

BACKGROUND OF THE INVENTION

1. Field of the Invention

The present invention relates to linear measure apparatus intended for measuring elongated material, such as cables, and comprising a measuring station which includes two endless belts each of which runs over two belt pulleys and between which the material to be measured is drawn, and further comprising sensors connected in the measuring station, and a counter unit which is connected to one of the sensors for indicating the length of said material.

2. Description of the Related Art

A linear measuring apparatus which includes two mutually opposed endless belts between which a material to be measured is drawn is known to the art. The belts are positioned vertically one above the other and the distance between the belts can be adjusted so as to bring the belts into friction abutment with the material such that movement of the material through the measuring apparatus will cause the belts to rotate around their respective pulleys. A sensor is connected to one of said belts and also to a counter unit for indicating measured lengths. The disadvantage with the known linear measuring apparatus of this kind is that the belts cannot be adjusted readily to positions in which the friction generated is sufficiently great to obviate the risk of slipping between material and belts and thus also the risk of obtaining wrong measurements. Also, though, the friction generated between the material and the belts cannot be so great as to make it difficult to draw the material through the apparatus. Further, when sensor is connected to only one of the belts, it is necessary to guide the material accurately in a vertical direction so that both belts will be influenced equally by the frictional forces generated, since otherwise the indicated measurements may be wrong. Furthermore, known linear measuring apparatuses also lack devices for marking the material in selected measured lengths.

OBJECTS AND SUMMARY OF THE INVENTION

The object of the present invention is to avoid the drawbacks with which earlier known linear measuring apparatus are encumbered and to provide a linear measuring apparatus which is of simple construction and reliable in operation and with which marking of determined lengths can be achieved simply and reliably. This object is achieved in that the belts are positioned horizontally side-by-side and in resilient abutment with the material to be measured, and; in that the sensors are pulse generators each of which is connected to one belt pulley of each endless belt, wherein the pulses generated by the pulse generators are conducted to the counter unit in which the mean value of the generated pulses representative of the material length is calculated. A marking unit is arranged downstream of the measuring station and connected to the counter unit for marking the elongated material at selected points on the measured length,; and a further pulse generator is connected to the other pulley of said one belt, wherein the pulses generated by this further pulse generator are conducted to the marking unit, via said counter unit, for delivering speed information to said marking unit.

The measuring station preferably includes a center arm which is freely pivotable about a centrally mounted, vertical pin, L-shaped outer arms which are pivotally mounted on vertical pivot pins at each end of the center arm, wherein longer legs of the arms are substantially parallel with and located horizontally beside the center arm and each of the longer legs supports on vertical shafts a respective one of the belt pulleys, and spring means which endeavour to draw the outer arms towards one another, wherein the endless belts lie in abutment with one another in the absence of elongated material therebetween.

The inventive linear linear measuring apparatus affords a number of advantages. For instance, because the belts resiliently abut the material, adequate friction will always be generated between the material and belts, therewith achieving optimum reliability in operation. Furthermore, because sensors are connected to both belts, guiding of the material through the apparatus is not critical. Marking of the material can also be effected with great precision and in a simple fashion, without the speed at which the material is drawn through the apparatus having a negative affect on the result.

The construction of the measuring station ensures that the station will always be correctly positioned and be in alignment with the direction in which the material is drawn through the apparatus. The construction is also simple and purposeful.

Other objects of the invention and other advantages afforded by an inventive linear measuring apparatus will be evident from the following description, which is made with reference to an exemplifying embodiment thereof and with reference to the accompanying drawings.

BRIEF DESCRIPTION OF THE DRAWINGS

FIG. 2 is a top view of a measuring station included in the measuring apparatus of FIG. 1.

DETAILED DESCRIPTION

Figure 1:
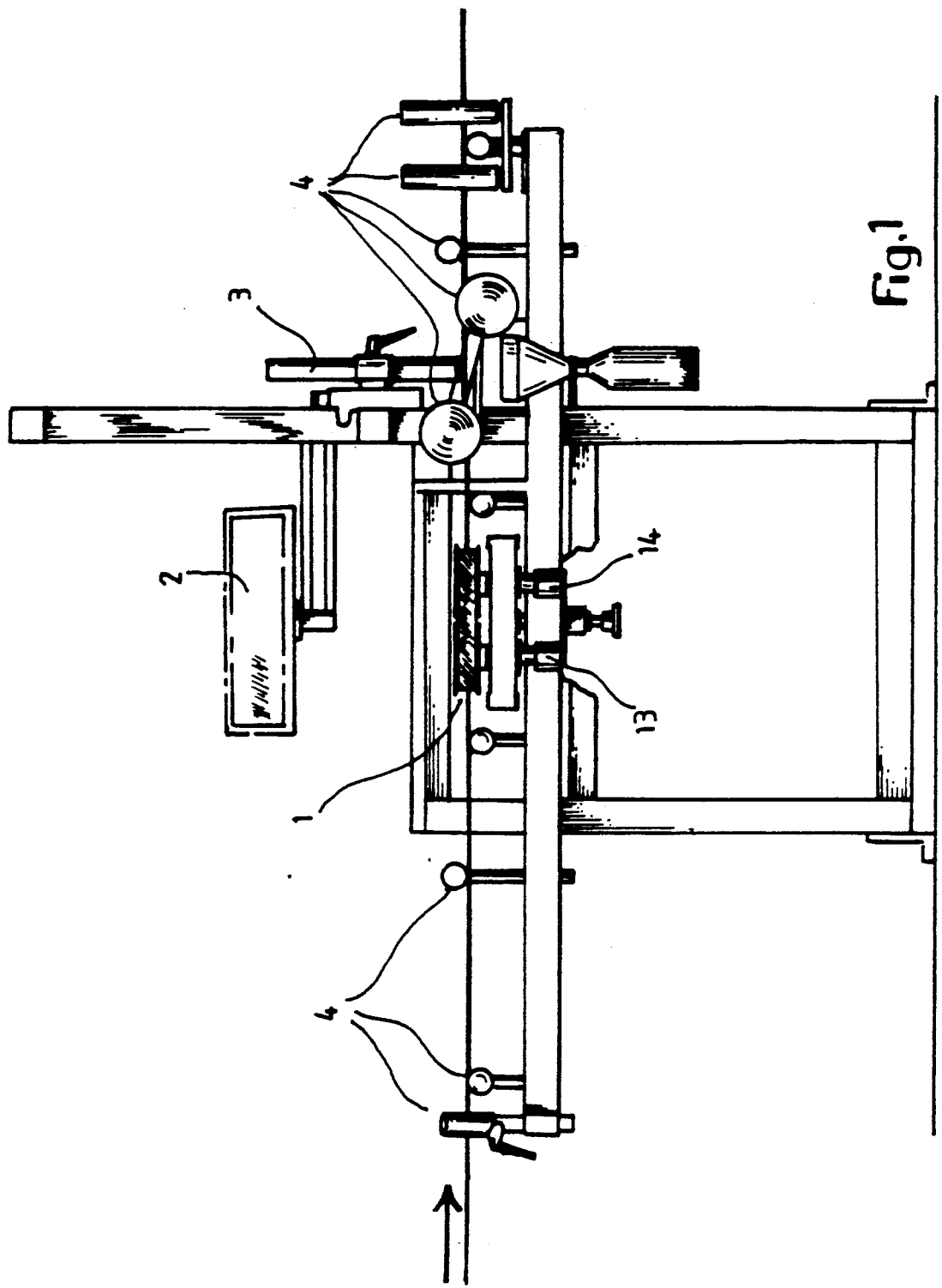
FIG. 1 is a side view of a linear measuring apparatus.

FIG. 1 is a side view of linear measuring apparatus constructed in accordance with the invention. The measuring apparatus is mounted on a table, a stand or the like, and includes a measuring station 1 and a counter unit 2. The material to be measured is drawn through the measuring station 1, which is described in more detail below, between two endless belts from the left to the right in the Figure, in the arrowed direction. The apparatus is preferably intended for measuring cables and the like and is preferably placed in the production line upstream of a cable-coiling station. The measuring apparatus also includes a marking unit 3 which is connected to the counter unit 2 for marking and indicating lengths of the material at selected measured lengths, optionally combined with the marking of information, for instance the manufacture and type of cable. The material is guided through the apparatus by guide rollers 4 which guide the material horizontally through the measuring station 1 and past the marking unit 3 in, as straight a manner as possible.

The measuring station 1 will now be described in more detail with reference to FIG. 2. The station 1 includes a belt assembly including two endless belts 5a and 5b which extend horizontally, side-by-side, around two respective belt pulleys 6a and 6b. The material to be measured is drawn horizontally through the belt assembly, and between the belts with the belts and material in resilient abutment with one another, wherein the friction generated between the material and the belts cause the belts to be driven around said pulleys in the same direction and at the same speed as the material. The belts 5a and 5b are preferably toothed belts and the belt pulleys 6a and 6b are sprocket wheels, in order to prevent slipping between the belts and the pulleys, which would otherwise give rise to wrong measurements. The belt assembly is mounted on an arrangement which comprises a center arm 7 which is freely pivotal about a centrally located vertical pin 8. An outer L-shaped arm 9 is pivotally mounted on vertically extending pins 10 at each end of the arm 7. Vertical shafts 11 which carry respective pulleys 6a and 6b are rotatably mounted on the longer legs 9a of the outer L-shaped arms 9. The legs 9a extend substantially parallel with and by the side of the center arm 7 and are drawn in towards the center arm by spring means 12, so that the endless belts 5a and 5b will abut one another in the absence of material therebetween. The spring means 12 ensure that the requisite degree of friction is generated between the belts and the material as the material is drawn through the belt assembly. The pivotal motion of the belt assembly around the central pin 8 causes the assembly to adjust to the direction in which the material is drawn, so that no lateral forces will act on the endless belts and give rise to an erroneous measuring result.

The material passing through the apparatus is measured with the aid of pulse generators 13 and 14 mounted beneath the measuring station, as clearly shown in FIG. 1, and constructed to generate a given number of pulses with each revolution of the belts. In the illustrated case, two pulse generators 13 are connected to one shaft 11 of each respective pulley 6a and 6b. The pulses produced by the pulse generators are delivered to the counter unit 2 where they are added together and, subsequent to converting the pulses to length measurements, the mean value of the delivered pulses is presented on a counter display as the measured length. The pulse generator 14 is connected to the other shaft 11 of one of the pulleys 6a or 6b and the pulses generated thereby are used to supply to the counter unit 2 information relating to the speed at which the material is drawn through the measuring station 1. As predetermined material lengths are measured, for instance meter lengths, the counter unit sends an initiating pulse to the marking unit 3, causing the marking unit to mark the material in said predetermined lengths, and optionally also to mark the material with additional information, such as information relating to manufacture, type, etc. The marking unit is preferably an ink jet printer. The speed information obtained from the pulse generator 14 is utilized to account for movement of the material from the measuring station 1 at the moment of measuring the predetermined length to the marking unit 3 at the time of marking said length, so that marking is effected at the correct location.

The counter unit 2 is preferably a "forwards-backwards" counter which when the material is drawn back through the measuring station 1, subtracts the pulses generated by the pulse generators 13 in the counter unit from a predetermined length measurement. In this case, no initiation pulse will be sent to the marking unit 3 from the counter unit until the material has again been drawn forwards through the measuring station and the predetermined length measurement has again been indicated in said station. The counter unit 2 also includes control buttons for setting the counter mechanism to zero, reprogramming the text printed by the marking unit and similar operations, and further includes outputs to external counter mechanisms, external speed meters and the like. It is also possible to change or reprogram the marking intervals, for instance each meter of length, each alternate meter of length, etc., and it is also possible to calibrate the counter unit by drawing a gauge through the apparatus.

It will be understood that the invention is not restricted to the aforedescribed and illustrated embodiment, and that modifications can be made within the scope of the following claims.

We claim:

1. A linear measuring apparatus for measuring elongated material, comprising:
   a measuring station which includes two endless belts which run over two belt pulleys and between which material to be measured is drawn, sensors connected to said measuring station, and a counter unit connected to said sensors for indicating material lengths, wherein said endless belts are arranged horizontally, side-by-side, and in resilient abutment with the material to be measured, wherein said sensors are pusle generators which are each connected to one belt pulley of each endless belt, pulses produced by said pulse generators being sent to said counter unit, wherein a mean value of said pulses is generated to represent the measured length;
   a marking unit arranged downstream of said measuring station and connected to said counter unit, for marking the elongated material at selected points of the measured length; and
   a further pulse generator connected to an other pulley of one of said belts, said pulses produced by said further pulse generator being sent to said marking unit, via said counter unit, to supply speed information to said marking unit.

2. An apparatus according to claim 1, wherein said measuring station further includes
   a center arm which is freely pivotal about a centrally mounted vertical pin,
   L-shaped outer arms which are pivotal about vertical pins mounted one on each end of said center arm, longer legs of said outer arms being substantially parallel with and lying horizontally adjacent to said center arm, and each of said longer legs carrying a respective one of said pulleys on vertical shafts, and
   spring means for biasing said outer arms about one another in the absence of elongated material therebetween.

3. An apparatus according to claim 2, wherein, subsequent to having measured a predetermined length of elongated material, said counter unit sends to said marking unit an initiating pulse which initiates marking of the material, wherein said speed information given by said further pulse generator is utilized to account for movement of the material between said measuring station and said marking unit from the moment of measuring the predetermined length at said measuring station to the time of initiating marking of the material by said marking unit.

4. An apparatus according to claim 3, wherein said counter unit is a forwards-backwards counter which, when material is drawn backward through said measuring station, subtracts pulses produced by said pulse generators from the predetermined length measurement, and wherein no initiation pulse is sent by said counter unit to said marking unit until the predetermined length measurement is again indicated in said measuring station.

5. An apparatus according to claim 4, wherien said marking unit is an ink jet printer.

6. An apparatus according to claim 1, wherein said endless belts are toothed belts, and said belt pulleys are sprocket wheels.

7. An apparatus according to claim 1, further including:

guide rollers located both upstream and downstream of said measuring station for guiding material through said apparatus.

* * * * *